(No Model.) 2 Sheets—Sheet 2.

H. ROESKE.
FILTER.

No. 442,397. Patented Dec. 9, 1890.

WITNESSES:
O. H. Cragle
L. Douville

INVENTOR
Henry Roeske
BY John A. Wiedersheim
ATTORNEY.

UNITED STATES PATENT OFFICE.

HENRY ROESKE, OF PHILADELPHIA, PENNSYLVANIA.

FILTER.

SPECIFICATION forming part of Letters Patent No. 442,397, dated December 9, 1890.

Application filed December 28, 1889. Serial No. 335,187. (No model.)

*To all whom it may concern:*

Be it known that I, HENRY ROESKE, a citizen of the United States, residing in the city and county of Philadelphia, State of Pennsylvania, have invented a new and useful Improvement in Filters, which improvement is fully set forth in the following specification and accompanying drawings.

My invention consists of a filter having means for directing water or other fluid into the filtering-chamber for reversing the course of the fluid and for passing the same into different compartments.

It also consists of means for agitating the filtering-bed in order to cleanse and refresh the same.

It further consists of means for electrically charging the water for destroying bacteria, germs, &c., therein.

It also consists of other features, as will be hereinafter fully set forth and definitely claimed.

Figure 1:
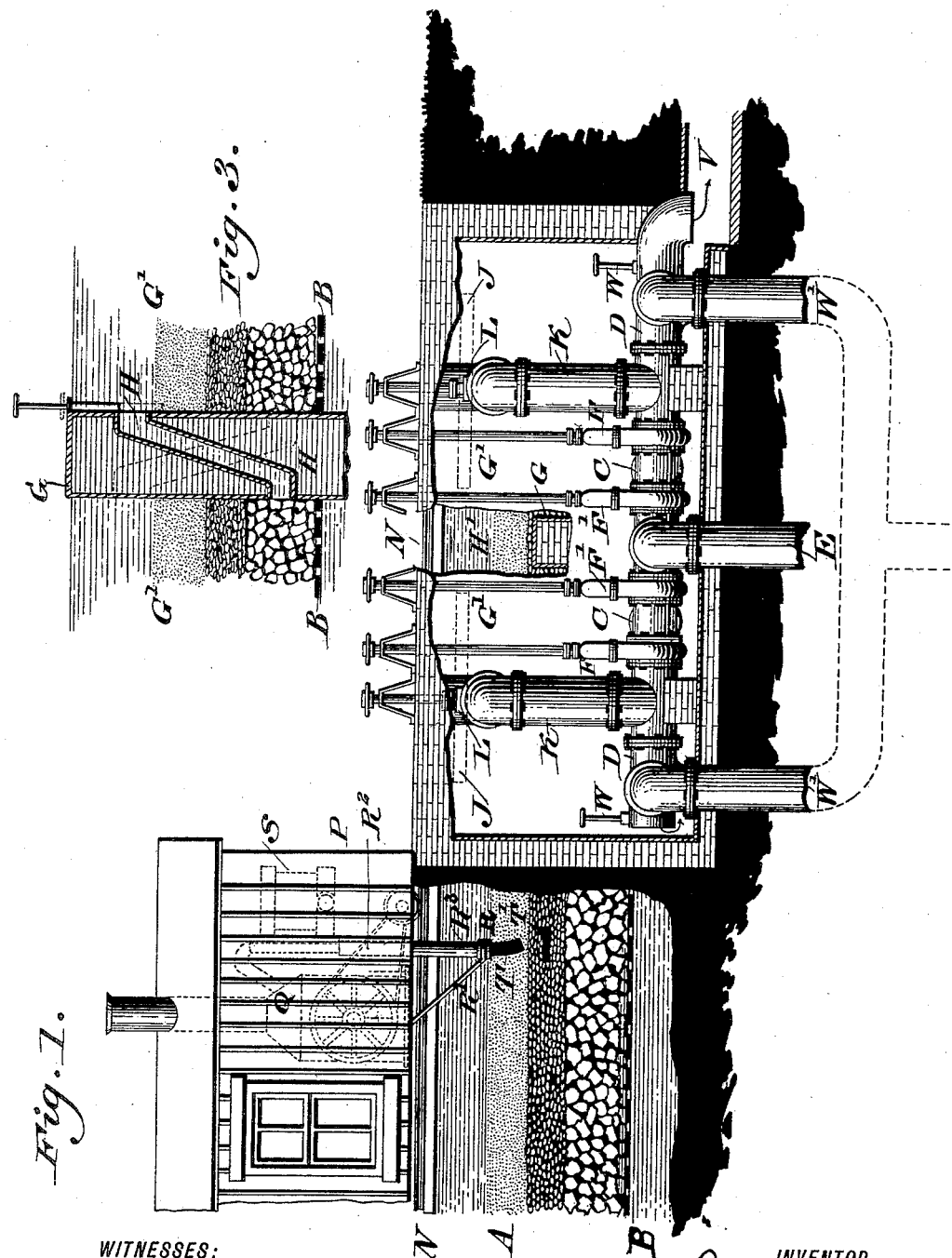
Figures 2, 4:
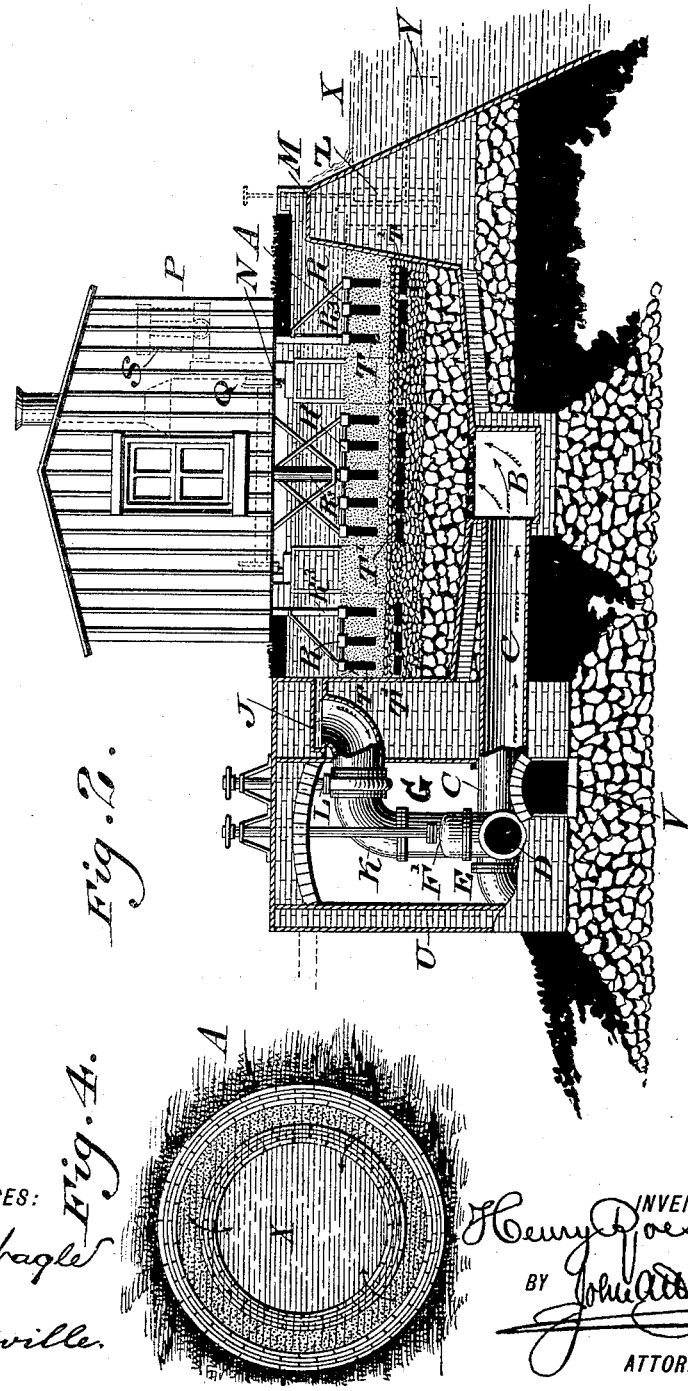

Figure 1 represents a partial side elevation and partial longitudinal vertical section of a filter embodying my invention. Fig. 2 represents a partial end view and a transverse vertical section thereof. Fig. 3 represents a vertical section of a detached portion thereof. Fig. 4 is a cross-section of the outlet for filtered water.

Similar letters of reference indicate corresponding parts in the several figures.

Referring to the drawings, A designates an open chamber, which is properly in the earth or a bank, supported and provided with suitable filtering material, and has beneath the same a well B, with which are connected the branch pipes C, the latter leading from the pipe D, to which the supply-pipe E is attached, said pipe D being provided on opposite sides of the place of connection of the pipe E with valves F F' for controlling the supply of water to said sides.

Within the chamber A is a vertical bridge-wall G, which passes through the well B and divides said chamber A into compartments G' G', which are in communication with each other through the passages or pipes H in said wall. These passages H are used when the filter is employed for downward filtration and upward flushing, the fluid passing from one compartment to the other through said passages, either up or down, as the case may be.

In the wall of the chamber A are channels J, with which communicate the pipes K, the latter being connected with the pipe D and provided with valves L, so as to open and close communication between said channels J and the pipe D, it being noticed that the channels J are below the level of the overflow M of the chamber A.

N designates rails, which are supported over the chamber A, and on the same is placed the house or cab P, which contains the engine Q, whereby motion may be communicated to the wheels of the cab, so that the latter may travel from end to end of the chamber A, said cab having depending from it the rakes R, which dip into the chamber A. Within the cab is a dynamo or generator S of electricity, which is in communication with the ends T of the rakes R, said rakes being of the form of electrodes, constituting one pole of a battery, the other pole consisting of the magnets T', which are placed in the filter-bed, whereby the water may be electrically charged in order to destroy bacteria or noxious germs therein.

The pipe D and parts immediately connected therewith are supported in a suitable vault U, below which is a conduit V, with which the ends of the pipe D are in communication, said ends having valves W for opening and closing said communication.

The pipe D is provided with additional pipes W', for purposes to be hereinafter set forth.

The operation is as follows: The proper valves are opened and the water or fluid to be filtered is admitted into the pipe D and flows from thence, through the pipes C, into the well B, and enters the chamber A at the bottom thereof, the fluid passing upwardly through the filtering material, and so reaches the overflow M, whereby it is directed into the reservoir X. Should it be desired to cleanse or freshen the filtering material or bed, the house or cab is moved, whereby the rakes R traverse the chamber A and agitate and liberate the deposits of mud and dirt in the filter-bed. The valves L are now opened and the valves F closed, the valves F' W being opened. The fluid enters the chamber A, as in the previous case, and carries off the impurities through the channels J, from whence it is directed by the pipes K into the ends of the pipe D, and so escapes into the conduit V, by which it is directed elsewhere. Again, by closing one of the valves F' and opening the other one, the valves F being closed, the fluid will enter one of the compartments G or G' of the chamber A, and, rising therein, will be filtered, it then being directed by either of the pipes H to the bottom of the other compartment G G', and, rising through the latter, will reach the overflow M, it being seen that the fluid is thus doubly filtered.

In the wall of the chamber A adjacent to the reservoir X is a pipe or channel Y, which is provided with a valve Z, it being noticed that the outlet of said pipe Y is below the level of the water in the reservoir X. By this provision fluid may be admitted into the reservoir when the reservoir is frozen.

The frames R', which carry the rakes or agitators R, are fitted to bosses which are connected with the cab P, as shown in Fig. 1, whereby said rakes may be raised and lowered for the purpose of adjusting the same, and also for adjusting the electrodes T T'. As the filtered fluid passes over the overflow M and drops into the reservoir, it is aerated by such action, the effect of which is evident. By properly closing and opening the valves the fluid is directed through the pipes W' into pipes D K, through chamber J into the chamber A, and then passes downwardly through the filter-bed into the well B and the pipes C, and so reaches the pipe D and is discharged through the pipe E.

For flushing either compartment there is a passage or channel H' above the wall G. In this case I proceed as follows: One of the valves F'—say the left-hand valve—is opened and the adjacent valve closed. The right-hand valve F' is closed and the adjacent valve opened. The fluid now passes through the left-hand pipe C into the well B, then upwardly through the filter-bed, overflows at the passage H', enters the right-hand compartment, descends the same through the bed, is directed into the right-hand pipe C, enters the pipe D, and escapes into the conduit V; but if the valve W is closed the escape of the fluid may be through the pipe W'.

Portions of the frames which carry the rakes or agitators R consist of tubes $R^3$, into which steam is admitted by a flexible or other pipe connected with the boiler of the engine in the cab P. By this provision steam may be injected into the filtering-chamber the entire length of the same, in order to agitate the same, said operation being accomplished while the cab or traveler is in motion, whereby the steam acts upon the fluid while in live condition, and the temperature of the water is raised, so that loosening of the mud or impurities is effectively occasioned.

Having thus described my invention, what I claim as new, and desire to secure by Letters Patent, is—

1. An open filter-bed, in combination with a traveler which is movable over the same and provided with a depending agitator which dips thereinto, substantially as and for the purpose set forth.

2. An open filter-bed, in combination with a horizontally-moving traveler mounted above the same, and one or more adjustably-connected agitators depending from said traveler and dipping into said bed, substantially as and for the purpose set forth.

3. A filter having an open filter-bed, a horizontally-moving traveler mounted above the same an electrode connected with the traveler, a generator of electricity, and an electrode in the filter-bed, substantially as and for the purpose set forth.

4. A filter having a filtering-chamber provided with an overflow M and an outlet J below the line of said overflow, in combination with a pipe K, which is in communication with said outlet, the pipe D, connected with said pipe K, and the conduit V, which is in communication with said pipe D, substantially as described.

5. A filter having an open filter-bed, a traveler mounted above the same, and a depending agitator adjustably connected with said traveler, said agitator constituting an electrode, substantially as and for the purpose set forth.

6. A filter having compartments, the divisional wall whereof having a passage above the same, and a conduit through said wall, substantially as described.

HENRY ROESKE.

Witnesses:
JOHN A. WIEDERSHEIM,
A. P. JENNINGS.